United States Patent
Sands

[11] 3,955,022
[45] May 4, 1976

[54] ANTISTATIC TUFTED CARPET

[75] Inventor: Seymour Sands, Wilmington, Del.

[73] Assignee: E. I. Du Pont de Nemours and Company, Wilmington, Del.

[22] Filed: Oct. 16, 1972

[21] Appl. No.: 297,805

[52] U.S. Cl. ............... 428/95; 428/234; 428/284; 428/300; 428/367; 428/408; 428/902

[51] Int. Cl.² ............... D03D 27/00; D04H 11/00; D05C 17/00

[58] Field of Search .......... 161/66, 67, 62, 71, 161/72, 78, 80, 403; 139/399, 420, 425; 428/95, 234, 284, 300, 367, 408, 902

[56] References Cited
UNITED STATES PATENTS

| | | | |
|---|---|---|---|
| 2,845,962 | 8/1958 | Bulgin | 139/420 |
| 3,288,175 | 11/1966 | Valko | 139/425 R |
| 3,582,445 | 6/1971 | Okuhashi | 161/66 |
| 3,678,675 | 7/1972 | Klein | 139/425 R |
| 3,806,401 | 4/1974 | Brinkhoff et al. | 161/67 |

*Primary Examiner*—Marion E. McCamish

[57] ABSTRACT

The invention provides a primary carpet backing having a thickness of less than 2 mm. measured at a pressure of 240 g./cm.² comprising a 2 to 6 oz./yd.² woven or bonded nonwoven sheet of continuous filaments or ribbons of polypropylene having needled thereto a 1 to 6 oz./yd.² layer of a blend of staple fiber containing from about 0.5 to 30% by weight of synthetic organic polymeric fiber containing conductive carbon and having a specific resistance of less than $1 \times 10^4$ ohm. cm.

5 Claims, 2 Drawing Figures

ANTISTATIC TUFTED CARPET

BACKGROUND OF THE INVENTION

This invention concerns a composite primary backing for use in the preparation of tufted carpets having low static propensity and attractive coloration. Considerable research has been done in the past to develop carpets which are free from annoying spark discharge. The discharge occurs when a person who has walked over the carpet touches a grounded surface, thereby releasing electrostatic charges collected from the carpet. One method for avoiding the development of electrostatic charges in carpets has been to use pile yarns containing a small percentage of conductive fibers such as copper, stainless steel, metal-plated fibers or carbon-filled organic polymeric filaments. Methods of this type are described in U.S. Pat. Nos. 3,582,444; 3,582,445; 3,288,175; 2,764,185; British Pat. No. 1,216,515; and French Pat. No. 1,567,529 (Example 1). While this conductive pile approach has been useful in loop pile carpets it has not been very effective in cut pile carpets.

Another approach has been to use conductive materials in latex applied to the lower surface of the backing, as for example in U.S. Pat. No. 3,510,386 and French Pat. No. 1,567,536. While this latex method is useful when the pile fibers are conductive it is less effective when the pile fibers are nonconductive. In U.S. Pat. No. 2,302,003, a method has been described which utilizes conductive latex as a coating for some of the pile tufts and also as a coating for the entire back side of the carpet. The latex is made conductive by incorporating conductive carbon. This method is not completely adequate, for the conductive carbon tends to wick up into the pile causing dark spots to show through the pile. In addition when a secondary backing is glued to the bottom surface of the primary backing, the conductive carbon runs through the secondary backing making it unattractive.

Another solution lies in use of stainless steel fibers in both backing and in pile as in U.S. Pat. No. 3,288,175, but the cost is excessive for carpets destined for ordinary home use. Also experience has shown that conductivity of carpets containing metallic fibers tends to decrease with continuing use, possibly through loss of the fiber from the carpet.

Aside from the work which has been done to make tufted carpets antistatic, considerable work has been done on floor mats which are used in the untufted state. These mats are dense and very thick and cannot be used for tufting because of needle breakage or destruction of the carpet backing during tufting. French Pat. Nos. 1,567,529 and 1,567,536 describe mats of this type.

SUMMARY OF THE INVENTION

The invention provides a primary carpet backing having a thickness less than 2 mm. measured at a pressure of 240 g./cm.$^2$ comprising a 2 to 6 oz./yd.$^2$ woven or bonded nonwoven sheet of continuous filaments or ribbons of polypropylene having needled thereto a 1 to 6 oz./yd.$^2$ layer of a blend of staple fiber containing from about 0.5 to 30% by weight of synthetic organic polymeric fiber containing conductive carbon and having a specific resistance of less than $1 \times 10^4$ ohm. cm.

LIST OF FIGURES

DETAILS OF THE INVENTION

Figure 1:
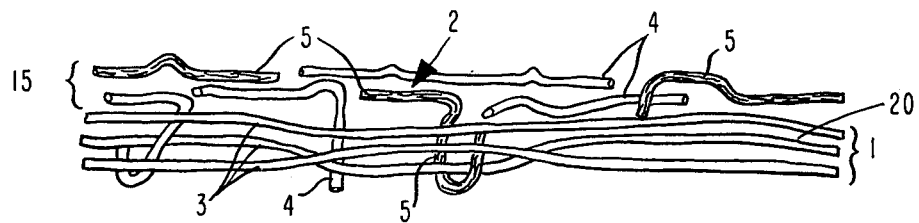
FIG. 1 is a diagram showing a cross-section of one type of primary backing of the invention.

In FIG. 1, the carpet backing of the invention is illustrated as a composite 20 comprising a woven or bonded non-woven sheet 1 made from continuous filaments 3 of polypropylene, said sheet 1 bearing on one surface thereof a layer 15 comprising a staple fiber blend 2 which includes synthetic fiber 5 containing conductive carbon and having a specific resistance of less than $1 \times 10^4$ ohm. cm. and other fiber 4, at least some of the fiber of layer 15 being interspersed in sheet 1 as by needling, whereby layer 15 is affixed to sheet 1.

Sheet 1 may be a woven fabric in which the filaments may for example be polypropylene ribbons, either fibrillated or unfibrillated. If nonwoven material is used, a bonded nonwoven of the type described in Edwards U.S. Pat. No. 3,563,838 is satisfactory.

The blend of fibers 2 consists of (a) conductive fibers, i.e. a specific resistance of less than $1 \times 10^4$ ohm. cm. and (b) fibers of higher resistivity which preferably are dyeable. The latter may be of any dyeable synthetic organic polymer of fiber-spinning molecular weight such as polyesters, polyamides, polyethers, polyurethanes, acrylic or modacrylic polymers.

The conductive fibers in the blend may be of any synthetic organic polymeric composition providing they contain sufficient conductive carbon to provide a specific resistance less than $1 \times 10^4$ ohm. cm. Generally the required specific resistance is obtained with fibers having at least 16% conductive carbon. The fibers may be single component or bicomponent. If bicomponent, the two polymeric species may be arranged side-by-side along the length of the filament or arranged as sheath and core.

One suitable conductive fiber for use in the blend is 6-nylon, polyepsiloncaproamide, containing 16 to 28% by weight conductive carbon distributed throughout the fiber. Fiber with adequate conductivity is prepared by the method described in copending U.S. patent application Ser. No. 279,825, filed on or about Aug. 11, 1972 (RD-1764-B) to Hull.

Another suitable low resistance fiber for use in the blend is the sheath/core fiber described in copending U.S. patent application Ser. No. 273,793 (RD-1764) filed on or about July 21, 1972 to Hull, abandoned and refiled on June 19, 1973 as patent application Ser. No. 371,507. This fiber has a polyethylene core containing 20 to 35% conductive carbon and a sheath of polyamide.

A polypropylene fiber containing 16 to 33% conductive carbon may also be used in the blend.

The layer 15 comprised of the blend of staple fibers is held to sheet 1 by fibers of the blend which penetrate the sheet. These are provided by needling the staple blend through the sheet using standard needling equipment.

Figure 2:
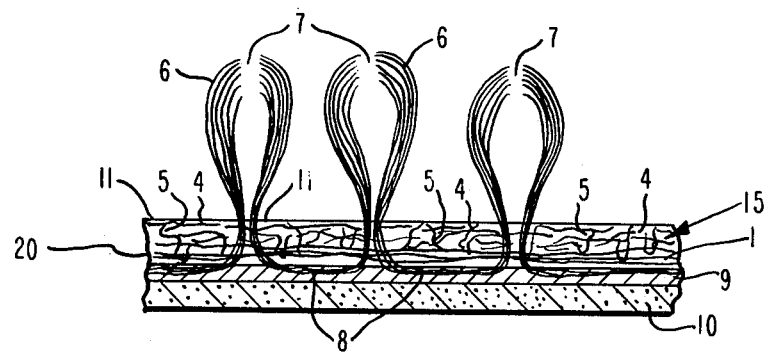
FIG. 2 is a diagram showing a cross-section of a tufted carpet prepared from the primary backing of FIG. 1.

The primary backing composite of FIG. 1 has a total weight after needling of 3 to 12 oz./yd.$^2$ and a thickness less than 2 mm. at 240 g./cm.$^2$ pressure. Composites of this weight and thickness are readily tufted with available tufting needles without damage to the needles or the composite sheet. The backing is used to prepare tufted pile carpets having a total pile weight of 10 to 50 oz./yd.$^2$ before latexing. These carpets may be dyed to attractive bright shades, have a soft pile surface, low static propensity, good tufted tongue tear strength, and good tufted grab strength. The construction of carpets prepared from the primary backing composite of FIG. 1 is shown in FIG. 2. The upper surface 11 of the backing is the side which is formed when the staple blend is deposited for example in the form of a carded web, prior to needling. The tufts 6 of the carpet pass completely through the backing composite. The pile yarn is continuous in the portion 8 along the under side of the carpet. In cut pile carpets, there is a discontinuity 7 which is caused by cutting of the loops during tufting. The pile yarns in cut pile carpets are not efficient conductors because of the discontinuities along the yarn. The backing 20 therefore provides a means for bridging the discontinuities.

Tufted carpets usually have a layer of latex 9 to hold the tufts in place. In addition a secondary backing 10 may be glued or otherwise bonded to the bottom face to provide still greater permanence to the positioning of tufts in the carpet. These layers 9 and 10 may optionally contain conductive materials to promote still greater charge dissipation.

The composite material of the invention may be tufted with commercially available carpet yarns. Carpets with exceptionally low static propensity are obtained by utilizing conductive fibers in the pile yarns as well as in the composite backing material of the invention. When conductive fibers are used in the composite layer, the amount of conductive fiber in the pile can be reduced.

The composite structure of FIG. 1 is especially useful since its upper surface may be made readily dyeable by appropriate selection of the nonconductive fiber in the staple blend.

TEST METHODS

Density and Thickness of Backing

The weight in grams of a 100 cm.$^2$ backing sample is measured. The thickness is measured with a thickness gauge at a pressure of 240 g./cm.$^2$. Density is calculated in gm./cm.$^3$ from the thickness and weight per unit area.

Shuffle Test

This test measures the static build-up on carpets by simulating conditions of use under which carpet static may become objectionable. The method is described in AATCC Manual, Vol. 47 (1971), Test Method 134–1969. The tufted carpet samples are first scoured and dried. Then the carpets are latexed by applying 30 oz./yd.$^2$ (on a dry basis) of a standard styrene-butadiene latex containing 70% solids by weight, e.g. Alco Chemical Company's No. 6676. The latexed carpets are conditioned 60 hours at 70°F. and 20% relative humidity before testing. The voltage which is developed between an operator and ground potential is recorded on a chart while the operator walks on the carpet. The peak voltages on the chart are analyzed and the highest voltage generated is recorded as the shuffle test voltage. It is believed that the shuffle test data reported here are repeatable within a 20% range.

Specific Resistance of Fiber

The specific resistance of a fiber is calculated from the resistance in ohms, the length of the sample and the cross-sectional area of the fiber. The resistance is measured with a volt-ohm meter (VOM). A skein is formed containing 100 filaments in the total cross-section. Clamps on the probes of the VOM are attached to the skein 1 inch apart and resistance is measured in ohms. The resistance for a single filament is then 100 times this value. The specific resistance K of the filament is calculated from the formula:

$$K = R \times A/L$$

where.

K is the specific resistance in ohm-cm.
R is the resistance in ohms.
A is the cross-sectional area of the filament in cm.$^2$
and L is the length in cm. of filament measured.
Cross-sectional area of the fiber is determined microscopically. For round fibers this is readily calculated from $A = \pi r^2$ where $r$ is the radius in centimeters.

EXAMPLE I

A lubricated bonded, nonwoven polypropylene sheet (I–C) of the type shown in Edwards U.S. Pat. No. 3,563,838 and weighing 4 oz./yd.$^2$ was used in the preparation of several backing composites. A web of blended staple fibers prepared on a garnett was laid on the bonded sheet. The web was a blend of 90% by weight 6–6 nylon staple fibers, and 10% by weight sheath/core fiber. The sheath/core fiber was a bicomponent fiber consisting of 96% by weight 6–6 nylon sheath and 4% by weight of polyethylene core. The polyethylene core contained 70% polyethylene and 30% conductive carbon black (XC-72 from Cabot Chemical Corp.). The specific resistance of the fiber was 9.4 × 10$^2$ ohm. cm. The average fiber length of the blend of nylon staple and conductive fiber was 3 inches and the average denier per filament was 3.5. The blended staple web weighed 2.5 oz./yd.$^2$. The two layers were needled together by use of a needling machine providing 300 penetration/in.$^2$ (about 47 per cm.$^2$). The resulting needled primary backing composite I–A weighed about 6.5 oz./yd.$^2$.

For comparison a needled primary backing composite I–B was prepared with a web of 100% 6–6 nylon staple (no conductive additive) and the same bonded nonwoven polypropylene sheet I–C.

Another needled primary backing composite I–D was prepared from the same bonded nonwoven polypropylene sheet I–C and a web of blended staple fibers of which 95% by weight are 6—6 nylon staple fibers and 5% are conductive staple fiber prepared from 78% by weight of 6-nylon and 22% conductive carbon (XC-72 from Cabot Chemical Corp.). The specific resistance of the latter was 9.4 × 10$^2$. The two layers were needled together as in I–A.

The density of each of the backing composites I–A, I–B, and I–D was 0.22 g./cm.$^3$ and thickness was 0.84 mm. The primary backing composites I–A and I–D are products of the invention. Tufted carpets were prepared with these backings. They are described in Examples III and IV.

EXAMPLE II

A needled primary backing composite of the invention was prepared from a fabric woven from polypropylene ribbons and weighing 3.2 oz./yd.$^2$ and the same staple fiber web as used for I-D. The weight of the staple fiber web was 2.5 oz./yd.$^2$. The needled composite was prepared as in I-D. Its density was 0.22 g./cm.$^3$ and its thickness was 0.84 mm. A carpet prepared with this composite as backing is described in Example IV.

EXAMPLE III

The carpet backing composites I-A and I-B from Example I were each tufted using 2600 denier bulked continuous filament 6—6 nylon as pile yarn. A cut pile plush style was prepared using 5/32-inch gauge, 7 stitches per inch, ¼-inch pile height, and 22 oz./yd.$^2$ of tufting yarn. The tufted carpets were scoured in a beck and dyed with Merpacyl Red L dye by treating the carpet as described in Du Pont Technical Service Bulletin N-247, page 5. After drying, the carpets were latexed and samples were subjected to the Shuffle Test to assess static propensity. The voltage developed in the shuffle test is reported in Table 1 for each of the carpets. The carpet III-A prepared from the backing composite I-A of the invention, containing conductive carbon in a sheath/core fiber, developed a voltage of 3.6 kilovolts while the carpet III-B from composite I-B, containing no conductive carbon, developed 5.7 kilovolts.

EXAMPLE IV

Carpet backing composites I-A, I-B, I-D and II were tufted with pile yarns which contained conductive stainless steel fibers and 6—6 nylon. The steel fibers were provided in 150 denier Brunslon yarn, a staple yarn wherein 13% of the fibers are stainless steel staple fibers of 3 denier and 87% are staple nylon of 2.5 denier per filament. One end of this conductive staple was plied with 1 end of 3650 denier continuous filament nonconductive 6—6 yarn to give a total denier of 3800. The plied yarn was used in every sixth needle of the tufting machine. The remaining needles carried bulked continuous filament 6—6 polyamide yarns of 2600 denier and 136 filaments wherein the filaments had a trilobal cross-section. The total pile of the carpet, therefore, contained 0.12% by weight stainless steel fibers. The cut pile carpets were tufted with 5/32-inch gauge, 7 stitches per inch, ¼-inch pile height and 21 oz./yd.$^2$ of tufting yarn. Table 1 shows shuffle voltage obtained on each of these carpets. The carpet IV-A prepared with conductive fibers in both the pile and the needled carpet backing developed less voltage in the shuffle test than carpet IV-B which had conductive fibers only in the pile. A similar improvement is shown with carpet IV-C over carpet IV-B. Carpet IV-D which is prepared from a composite of woven poly-propylene and conductive fibers is approximately equivalent to carpt IV-C made from a nonwoven polypropylene. Carpets III-A, IV-A, IV-C and IV-D are made from backing composites of the invention.

EXAMPLE V

A 6-nylon polymer was prepared from a mixture of conductive carbon (Cabot XC-72) and an aqueous solution of epsiloncaprolactam. The mixture was first heated to 250°C. with maximum pressure 250 lb./inch$^2$ for 6 to 7 hours to open the lactam ring and prepolymerize. The pressure was then reduced gradually to atmospheric in about 90 minutes to complete the polymerization. The resulting black polymer which contained 22% carbon and 78% 6-nylon was melted in an autoclave equipped with stirrer at temperatures about 256°C. and then spun by passing through a filter pack at 260°C. and then through a spinneret at 255°C. at a rate of 0.6 g./min./hole. The fibers that were formed were passed over a feed roll at 140°C., 475 yards/minute and then drawn 1.5X. The resulting black fibers were 8 dpf. The specific resistance of the carbon fiber was 9.4 × 10$^2$ ohms.-cm.

The fibers were cut into 3-inch staple lengths. This conductive fiber was used in various blends as outlined in Table 2 to determine the importance of where the conductive fiber was placed within the carpet. All backings in Table 2 were prepared by needling layers of a carded web, the so-called overlay, (2.5 oz./yd.$^2$) into a polypropylene nonwoven substrate (3.5 oz./yd.$^2$). Needling was carried out on a needle loom. The needles penetrated the two layers about 300 penetrations/in.$^2$.

The overlays, some of which contained the conductive fibers, were prepared on a standard sample card machine. Overlays for the backings used for Table 2 were each 2.5 oz./yd.$^2$. The composite backing for Carpet V-A in Table 2 had an overlay composed of 10% conductive black 6-nylon staple fiber (0.25 oz.-/yd.$^2$ of the conductive fiber in the needled backing) and 90% nylon staple waste fiber. The overlay for the composite backing in Carpet V-B contained 5% of the conductive black 6-nylon fiber and 95% of the nylon staple fiber (0.125 oz./yd.$^2$ of conductive fiber in the needled backing). Overlay for the backing in Carpet V-C contained no conductive black fiber.

The yarns for the pile in carpets of Table 2 were spun from a blend of 3-inch nylon staple fibers and 0, 0.125% and 0.25% of conductive black 6-nylon fiber. Carpets V-A, V-B and V-C were prepared by tufting the staple blend yarns into the backings to give 25 oz./yd.$^2$ of tufting yarn in the carpets. The pile yarn for Carpet V-A was all nylon staple. Pile yarn for V-B contained 0.5% of the conductive black 6-nylon fiber or 0.125 oz./yd.$^2$. Pile yarn for Carpet V-C had conductive black 6-nylon fiber blended in with the nylon staple or 0.25 oz./yd.$^2$.

Carpets V-A, V-B and V-C in Table 2 were prepared by tufting on a standard ⅜ gauge cut-pile tufting machine, e.g., a sample machine made by the Singer Company. The pile construction was 4.5 stitches per inch and the pile height was 1.25 inch.

The carpets were dyed conventionally using the dyeing procedure in Du Pont Technical Service Bulletin, N-247 (6/71), page 7, for dispersed dyeing of nylon carpets using the dyes, 0.65% Acetamine Yellow CG and 0.16% Celanthrene Fast Blue CR. After the carpets were dyed and rinsed, they were subjected to a mild oxidative scour which used 4.0% sodium perborate, 0.5% Merpol CNR and 0.25% trisodium phosphate. The carpets were thoroughly rinsed with demineralized water. Dried and latexed with the Alco Chemical Company latex No. 6676. After drying and curing at 110°C. for 30 minutes, the carpets were conditioned at 70°F. and 20% RH for 60 hours and tested according to the shuffle test. Results are given in Table 2 and show the desirability of having conductive fibers both in the backing and in the pile for the most effective use of the fibers to reduce static build-up on carpets.

EXAMPLE VI

To determine the importance of conductive fiber content in the overlay of the needled backings, varying percentages of 3-inch long conductive carbon black fibers were added to nylon staple fibers in overlays of 2.5 oz./yd.$^2$ that were needled into 3.5 oz./yd.$^2$ bonded nonwoven polypropylene sheet. The composite sheet was tufted using as pile yarn a 2600 denier bulked continuous filament 6— 6 nylon containing three filaments of sheath/core conductive fiber of the type described in Example I, except that the denier per filament was 7. A cut pile carpet was prepared. The conductive fiber percentages in the staple blends and the shuffle test results for the carpets are given in Table 3 (Examples VI–A to VI–F). All of the cut pile carpets with 0.5% or more of carbon-containing fiber in the staple blend had satisfactory resistance to static build-up.

EXAMPLE VII

Isotactic polypropylene flake having a melt flow rate of 3.7 grams/10 minutes was blended with conductive carbon black (Cabot XC-72) using 78.4% by weight polypropylene and 21.6% by weight conductive carbon and then further blended in the melted state. The resulting polymer before spinning had a specific resistance of 3 ohm. cm. The polymer was then spun through a spinneret having 40 round holes with a diameter of .015 inch at 270°C. at a rate of 0.6 grams/minute/hole. The extruded filaments were passed over a feed roll and drawn continuously between feed roll and a wind-up roll. Sample A was drawn at 1.5X draw ratio and wound up at 250 yards/minute. Sample B was drawn at 3X draw ratio and wound up at 500 yards/minute. The drawn yarns were cut off of the bobbins and used separately for preparing staple, the staple length being about 3 inches. This staple was blended with 6—6 nylon staple of about 3 inches length and a card web was prepared. This card web weighing 2.5 oz./yd.$^2$ was laid on a bonded polypropylene nonwoven web weighing 3.5 oz./yd.$^2$ and the two layers were needled together with about 300 penetrations/in.$^2$. The resulting composites A and B had densities of 0.21 and 0.22 g./cm.$^3$, respectively and thickness of 0.88 mm. and 0.84 mm. respectively.

The needled composites were used as a primary carpet backing for tufted carpets. Cut pile carpets were prepared from the two composites A and B using a tufting machine with ⅜-inch gauge. Every sixth tuft row contained stainless steel fibers as in Example IV. The total pile contained 0.12% stainless fiber. The carpet was tufted with a pile height of 1.25 inches and with 4.5 stitches/inch. The properties of the polypropylene fiber, the carpet backing composite, and the finished carpet are shown in Table 4.

TABLE 1
PROPERTIES OF CARPETS

| Example No. | Backing Composition | Pile Composition | Carpet Style | Carpet Shuffle Test, Voltage, KV |
|---|---|---|---|---|
| III-A | PPNW//10% sheat-core/ 90% 6-6 | 100% 6-6 | Cut, plush | 3.6 |
| III-B | PPNW//100% 6-6 | 100% 6-6 | Cut, plush | 5.7 |
| IV-A | PPNW//10% sheath-core/ 90% 6-6 | 99.88% 6-6 0.12% stainless | Cut, plush | 2.0 |
| IV-B | PPNW//100% 6-6 | 99.88% 6-6 0.12% stainless | Cut, plush | 4.2 |
| IV-C | PPNW//5% 6 with Carbon/ 95% 6-6 without Carbon | 99.88% 6-6 0.12% stainless | Cut, plush | 2.4 |
| IV-D | PPWOV//5% 6 with Carbon/ 95% 6-6 without Carbon | 99.88% 6-6 0.12% stainless | Cut, plush | 2.3 |

Code:
PPNW is polypropylene nonwoven
PPWOV is polypropylene woven

TABLE 2
IMPORTANCE OF CONDUCTIVE FIBER POSITION IN CARPET

| Example No. | Amount of Carbon-Containing Fiber, oz./yd.$^2$ In Backing | In Cut Pile | Shuffle Test, KV |
|---|---|---|---|
| V-A | 0.25 | 0 | 4.8 |
| V-B | 0.125 | 0.125 | 1.5 |
| V-C | 0 | 0.25 | 3.4 |

TABLE 3
EFFECT OF % OF CONDUCTIVE FIBER IN OVERLAY ON SHUFFLE TEST VALUES

| Example No. | Backing Composition* | Shuffle Test, KV |
|---|---|---|
| VI-A | PPNW | 3.0 |
| VI-B | PPNW//Nylon | 3.5 |
| VI-C | PPNW//C. blend with 0.5% c. fiber | 2.0 |
| VI-D | PPNW//C. blend with 1% c. fiber | 1.8 |
| VI-E | PPNW//C. blend with 3% c. fiber | 1.8 |
| VI-F | PPNW//C. blend with 5% c. fiber | 2.2 |

Code:
PPNW is polypropylene nonwoven
Nylon is staple nylon blend free of conductive fiber
C. Fiber is carbon-containing fiber with 22% conductive carbon

TABLE 4
PROPERTIES OF FIBERS, BACKINGS, AND CARPETS UTILIZING CONDUCTIVE POLYPROPYLENE

|  | Example VII A | Example VII B |
|---|---|---|
| % by Weight Conductive Fiber: |  |  |
| Based on Overlay | 5 | 5 |
| Based on Total Needled Composite | 2.1 | 2.1 |
| Conductive Fiber Denier per Filament | 23 | 11.5 |
| Conductive Fiber Specific Resistance, ohm. cm. | 48.7 | $2 \times 10^3$ |
| Shuffle Test Voltage, KV | 1.5 | 1.7 |

What is claimed is:
1. A primary carpet backing having a thickness of less than 2 mm. measured at a pressure of 240 g./cm.$^2$ and comprising a 2 to 6 oz./yd.$^2$ woven or bonded nonwoven sheet of continuous filaments or ribbons of polypropylene and having needled thereto a 1 to 6 oz./yd.$^2$ layer of a staple fiber blend containing from about 0.5 to 30% by weight of conductive carbon-containing synthetic organic fiber having a specific resistance of less than $1 \times 10^4$ ohm. cm.

2. The composite of claim 1 wherein the conductive fiber is polypropylene fiber containing conductive carbon black.

3. The composite of claim 1 wherein the conductive fiber is 6-nylon containing conductive carbon black.

4. Tufted carpet having low static propensity, comprising a backing composite having a thickness of less than 2 mm. measured at a pressure of 240 g./cm.$^2$ and comprising a 2 to 6 oz./yd.$^2$ woven or bonded nonwoven sheet of continuous filaments or ribbons of polypropylene and having needled thereto a 1 to 6 oz./yd.$^2$ layer of a staple fiber blend containing from about 0.5 to 30% by weight of conductive carbon-containing synthetic organic fiber having a specific resistance of less than $1 \times 10^4$ ohm. cm. and pile yarn tufted through the backing composite.

5. The carpet of claim 4 wherein the pile is cut.

* * * * *